United States Patent Office 3,121,104
Patented Feb. 11, 1964

3,121,104
ARYL SULFONATES
James Gordon Burt, Oxford, Pa., assignor to E. I. du Pont de Nemours and Company, Wilmington, Del., a corporation of Delaware
No Drawing. Filed Sept. 18, 1961, Ser. No. 138,617
5 Claims. (Cl. 260—456)

This invention relates to new chemical compositions and more particularly to novel sulfonate esters.

Alkylaminoalkyl phenols and their salts are known in the art as being useful as surface active or wetting agents and for other purposes. Such compounds, however, are generally ionic and are reactive with caustic, heavy metal ions, e.g., zinc, iron, manganese, etc. undergoing metathetical decomposition. Heavy metal ions of this type are generally present in petroleum products and form precipitates with ionic surfactants plugging pumps, filters and narrow orifices.

An object of this invention is to provide a new class of aryl sulfonate ester compositions. Another object is to provide such compositions which are non-ionic. Still another object is to provide such compositions which are stable to caustic. A further object is to provide such compositions which are prepared from readily available materials. Other objects will be apparent from the following description of the invention.

The new compositions of this invention are represented structurally by the formula:

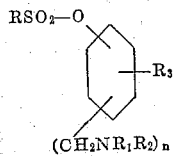

wherein R is a radical selected from the group consisting of unsubstituted alkyl, alkylcycloalkyl, and alkaryl radicals of 12 to 30 carbon atoms, and a chlorine-substituted derivative of said radicals; $R_1$ and $R_2$ are aliphatic radicals selected from the group consisting of an unsubstituted alkyl of 1 to 6 carbon atoms, said alkyl substituted with a member selected from the group consisting of hydroxyl and thio, said alkyl having as an integral member of the carbon chain a member selected from the group consisting of oxygen, nitrogen and sulfur atoms, and $R_1$ and $R_2$ when taken together form a heterocyclic ring with the nitrogen atom of 5 to 7 atoms; $R_3$ is a member selected from the group consisting of hydrogen and an alkyl radical of 1 to 4 carbon atoms; and $n$ is an integer of 1 to 3. $R_1$ and $R_2$ can be alike or different.

Examples of the novel sulfonate esters of this invention include:

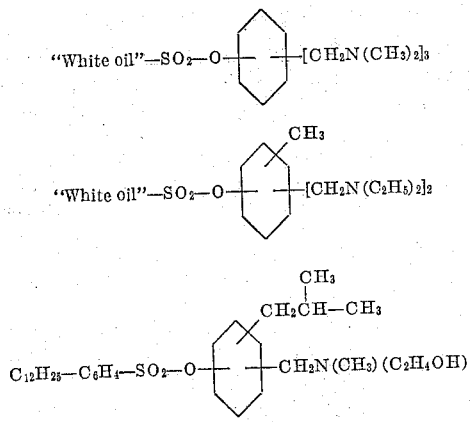

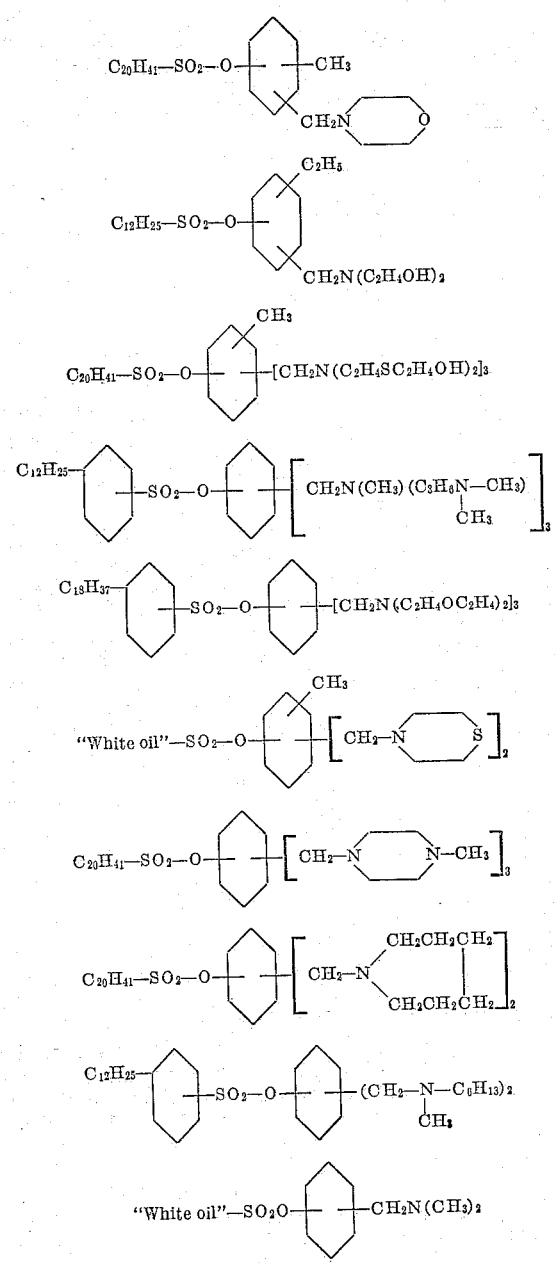

The term "white oil" in the above formulas refers to a sulfonate prepared by treating a highly refined petroleum fraction of a substantially saturated aliphatic hydrocarbon, i.e., a mixture of alkanes of various chain lengths averaging 16 to 20 carbon atoms, the alkanes may be straight chain, branched chain and cycloalkanes, i.e., cyclopentanes and cyclohexanes, and known as white oil and having the following physical characteristics:

Boiling range, 284 to 342° C.
Saybolt Universal viscosity at 100° F. of 36.0 seconds
Specific gravity, 20/15.5° C., 0.810 with chlorine and sulfur dioxide in the manner described in Fox U.S. Patent 2,174,506 and reacting the resulting sulfonyl chloride with a substituted aminoalkylphenol in the presence of an acid acceptor, such as ammonia or caustic soda. The preparation of the alkyl and aryl sulfonates is described by Suter in Organic Chemistry of Sulfur, John Wiley and Sons, Inc., New York, 1944, pages 507–508, 514–515 and 539–540, and Houben-Weyl, Methoden der Organischen Chemie, vol. 9, G. Thieme Verlag, Stuttgart, Germany, 1955, pages 388–389 (alkyl) and 671–672 (aryl). The novel compositions may also be obtained by reacting formaldehyde with a suitable phenol and secondary amine, then adding the sulfonyl chloride to the reaction mixture and esterifying in situ without isolation of the intermediate aminoalkylphenol.

In some instances in the preparation of Mannich bases, minor amounts of by-products are formed which are further condensation products of formaldehyde with the phenol, such as bis-methylene compounds, as may be illustrated by the formula:

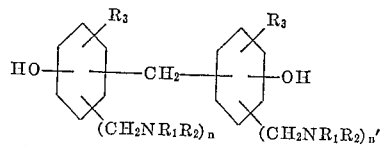

where the R's are as above defined and $n$ and $n'$ are 0, 1 or 2. The bis-methylene compounds when sulfonated form disulfonate esters. These compounds do not have to be separated from the mono esters since they possess similar properties and are not deleterious to the reaction or final product.

As examples of sulfonyl chlorides, in addition to the preferred white oil sulfonyl chloride described above, which may be used to prepare the sulfonic acid esters of the invention are the alsyl reaction products obtained as described in U.S. Patents 2,046,090; 2,202,791; 2,462,999 and Re. 20,968. These products are mixtures of chlorosulfonated alkanes and chlorosulfonated chloroalkanes and are obtained by passing a gaseous mixture of sulfur dioxide and chlorine into a liquid or liquefied saturated aliphatic or cycloaliphatic hydrocarbon mixture while irradiating with actinic light. Other long-chain aliphatic sulfonyl chlorides are suitable, especially those having 12 to 30 carbon atoms, such as dodecyl, n-hexadecyl and eicosyl sulfonyl chlorides, as well as aromatic sulfonyl chlorides having an alkyl chain of at least 8 carbon atoms, such as octyl-, dodecyl-, and hexa-decylbenzene sulfonyl chlorides.

The aminophenols which are used to form the ester component of the subject compounds may be obtained by reacting a phenol or alkylphenol having an alkyl group of 1 to 4 carbon atoms with formaldehyde in the presence of a secondary amine. Suitable aminophenols are disclosed in Bruson U.S. Patent 2,033,092 wherein the nuclear alkyl group is 4 carbon atoms or less. Also useful are the Mannich base compounds described in Adams, Organic Reactions, vol. 1, John Wiley and Sons, New York, 1942, p. 334, e.g., diethylaminomethylphenol, diisopropylaminomethyl cresol. In order to obtain the desired properties in the ester product, a secondary amine is required in the formation of the Mannich base. As examples of suitable amines are the following: dimethylamine, diethylamine, dibutylamine, methyl β-ethoxyethylamine, bis (β - hydroxyethyl)amine, bis(β - hydroxyethylthiaethyl) amine, methyl 3-dimethylaminopropylamine, piperidine, morpholine, hexamethyleneimine, N-methylpiperazine and thiamorpholine dioxide. Additional acid acceptors useful in the reaction include sodium carbonate, sodium acetate and calcium hydroxide.

The invention will be further illustrated by but is not intended to be limited to the following examples wherein the parts and percentages are by weight.

EXAMPLE I

Tri(Dimethylaminomethyl)Phenyl White Oil Sulfonate

To 62 parts of tri(dimethylaminomethyl)phenol are added simultaneously 150 parts of a white oil sulfonyl chloride as previously described and 12 parts of sodium hydroxide as a 30% solution at room temperature. The reaction mixture is stirred 8 hours and allowed to settle. The water layer is discarded, the oil remaining is washed with fresh water, and is dried by heating to 105° C. A yield of 133 parts of the product is obtained as a dark heavy neutral oil. Analyses: percent $S=5.0$, percent $N=2.0$.

When a round steel specimen was tested under the conditions of the ASTM D665–60 test, Book of ASTM Standards, American Society for Testing Materials, Philadelphia, Pa., 1960 Supplement to Part 7, pp. 86–93, Rust Preventing Characteristics of Steam and Turbine Oils in the Presence of Water, at 140° F., for 24 hrs., tri(dimethylaminomethyl)phenyl white oil sulfonate, added in a concentration of 10 lbs. per 1000 bbls. of No. 2 fuel oil prevented rust formation, while the round steel specimen tested in No. 2 fuel oil without the additive was heavily rusted.

EXAMPLE II

Di(Hydroxyethyl)Aminomethylphenyl White Oil Sulfonate

To a mixture of 23 parts of phenol, 26 parts of diethanolamine, 22 parts of concentrated hydrochloric acid and 50 parts of water are added 11 parts of formaldehyde as a 37% aqueous solution. The mixture is stirred 8 hours at room temperature at which time two phases are apparent, the organic layer having the greater specific gravity. To the mixture are added at room temperature 150 parts of a white oil sulfonyl chloride described above containing about 1.6 milliequivalents per gram of active ingredient. To the emulsion which forms are then added slowly at 30° C., 34 parts of sodium hydroxide as a 30% solution in water and the mixture is stirred for 8 hours. The mixture is then heated to 90° C. and the water layer discarded. The oil is washed with an equal weight of 15% brine solution and dried by heating to yield 127 parts of neutral product. Analyses: percent $S=4.7$, percent $N=1.1$.

Bis-methylene compounds are formed in minor amounts during the in situ reaction illustrated by this example, no effort being made to separate them from the mono esters. The bis-methylene compounds are sulfonated forming disulfonate esters which do not affect the surface-active properties of the mono esters. The disulfonate esters are also effective petroleum additives.

EXAMPLE III

Dimethylaminomethylphenyl Dodecylbenzenesulfonate

To 15 parts of dimethylaminomethylphenol are added 38 parts of dodecylbenzenesulfonylchloride, keeping the temperature at 45° C. After stirring 1 hour, a solution of 11 parts of sodium hydroxide in 100 parts of water is added dropwise. The emulsion is stirred 2 hours and heated to 95° C. to effect separation. The oil layer is washed with water and dried at 105° C. The product is a heavy oil having the following analyses: Percent $S=6.5$, percent $N=2.5$.

EXAMPLE IV

Diamylaminomethyl-3-Methylphenyl White Oil Sulfonate

To a well-stirred mixture of 25 parts of m-cresol, 55 parts of diamylamine, and 50 parts of water containing approximately 0.1 part sulfuric acid, are added dropwise at 20° C., 25 parts of 37% aqueous formaldehyde over a period of 1 hour. The mixture is stirred at room temperature for 18 hours and then separated roughly and the water layer discarded. To the crude mass are added 100 parts of water and 14 parts of sodium hydroxide. To this mixture is added slowly at 25–28° C., 150 parts of white oil sulfonyl chloride described above over a period of one hour and the reaction is agitated at room temperature for 2 more hours. The pH of the mass is adjusted downward to 7 to 8 with dilute sulfuric acid and the oil layer separated. The product is washed repeatedly with water and dried by heating to 105° C. A yield of 169 parts of a dark oil is obtained, having the analyses: Percent S=4.6, percent N=1.6.

By using the procedures of the examples, the above-described sulfonate esters can be prepared.

The compositions of this invention are useful as non-aqueous wetting agents, detergents and emulsifiers of water in oil and may be used alone or in admixture with other substances. Their unusually high surface activity is evidenced by their ability to reduce the interfacial tension between n-heptane and distilled water from 50 to as low as 1.2 dynes/cm. when used in a concentration of only 0.005% by weight. The compounds are effective as carburetor detergents in gasoline and as corrosion and sludge preventatives in mineral oils, greases, and crude oils despite the presence of traces of caustic. Since they are non-ionic, they do not react with bearings and other metal surfaces; thus they are useful in lubricants for close-tolerance bearings. Their non-ionic character makes them particularly appropriate as anti-corrosion additives in the presence of seawater, e.g., such as is encountered in the practice of flooding empty fuel-compartments in tankers or naval vessels to reduce fire hazard and maintain trim, etc.

The compositions of this invention are advantageous especially because they are non-ionic. They are stable to caustic, nonreactive with heavy metal ions and do not undergo metathetical decomposition. Still other uses and advantages will be apparent to those skilled in the art.

The embodiments of the invention in which an exclusive property or privilege is claimed are defined as follows:

1. A composition of the formula:

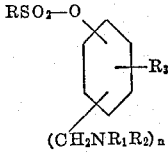

wherein R is a radical selected from the group consisting of unsubstituted alkyl, alkylcycloalkyl, and alkylphenyl radicals of 12 to 30 carbon atoms, and a chlorine-substituted derivative of said radicals; $R_1$ and $R_2$ are alkyl groups of 1 to 6 carbon atoms selected from the group consisting of unsubstituted alkyl, hydroxy alkyl, mercapto alkyl, and alkyl having the carbon chain interrupted by a single member selected from the group consisting of oxygen, sulfur and nitrogen atoms, and $R_1$ and $R_2$ when taken together with the nitrogen of the —$CH_2$—N= group form a 5 to 7 membered heterocyclic ring selected from the group consisting of an unsubstituted heterocyclic ring containing one nuclear nitrogen and 4–6 nuclear carbon atoms, piperazine, N-methyl piperazine, morpholine, thiamorpholine, and thiamorpholine dioxide; $R_3$ is a member selected from the group consisting of hydrogen and an alkyl radical of 1 to 4 carbon atoms; and $n$ is an integer of 1 to 3.

2. Dimethylaminomethylphenyl dodecylbenzenesulfonate.

3. A composition of claim 1 wherein R is as defined in claim 1, $R_1$ and $R_2$ are methyl, $R_3$ is hydrogen, and $n$ is 1.

4. A composition of claim 1 wherein R is as defined in claim 1, $R_1$ and $R_2$ are methyl, $R_3$ is methyl, and $n$ is 1.

5. A composition of claim 1 wherein R is as defined in claim 1, $R_1$ and $R_2$ are methyl, $R_3$ is hydrogen, and $n$ is 3.

No references cited.